United States Patent Office 2,954,370
Patented Sept. 27, 1960

2,954,370
PRODUCTION OF METAL-CONTAINING DYESTUFFS

Hans Baumann and Dieter Leuchs, both of Ludwigshafen (Rhine), Germany, assignors to Badische Anilin- & Soda - Fabrik Aktiengesellschaft, Ludwigshafen (Rhine), Germany No Drawing. Filed Dec. 18, 1957, Ser. No. 703,496

Claims priority, application Germany Dec. 22, 1956

10 Claims. (Cl. 260—146)

This invention relates to new dyestuffs and in particular to metal-containing water-soluble dyestuffs free from sulfonic acid groups which contain for each metal atom two monoazo and/or azomethine dyestuffs and which moreover carry at least once the grouping:

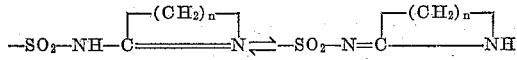

in which $n$ represents one of the whole numbers 3 to 7. For the sake of simplicity, this group is indicated hereinafter by the left of the two tautomeric formulae.

The new dyestuffs follow the general formula:

I.
$$(X-M-Y)^{\ominus} Q^{\oplus}$$

X being the radical of a monoazo dyestuff of the general formula:

II.
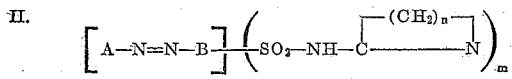

(wherein A represents the radical of an aniline free from sulfonic acid groups which bears in ortho-position to the amino group a complex-forming group, B the radical of a coupling component free from sulfonic acid groups, which contains a hydroxyl, a primary or a secondary amino group and couples in adjacent position thereto, $m$ one of the numbers 1 or 2 and $n$ an integer of from 3 to 7), Y either also the radical of a monoazo dyestuff of the above mentioned general Formula II or that of any other azo or azomethine dyestuff free from sulfonic acid groups, M a metal atom of one of the atomic numbers 24 to 29 and $Q^{\oplus}$ the equivalent of a cation as for example of the hydrogen, sodium, potassium or ammonium ion. As complex-forming groups in the general Formula II there come into question for example hydroxyl, alkoxyl, carboxyl and toluene-sulfonic acid ester groups.

The production of these new dyestuffs can be carried out in several ways:

(1) Monoazo dyestuffs of the general Formula II or mixtures thereof with each other or mixtures of such dyestuffs with any other azo or azomethine dyestuffs can be converted by known methods, either by themselves or in the dyebath or on the fiber, into their 1:2-metal complex compounds, derived from metals of an atomic number from 24 to 29. Furthermore 1:2-mixed complexes of the said metals which contain at least one monoazo dyestuff of the above general formula can also be prepared, instead of by metallizing a mixture of complex-forming dyestuffs, also by first converting a metallizable dyestuff into its 1:1-metal complex and then converting this into the 1:2-metal complex by adding on the equimolar amount of another metallizable dyestuff (step-wise metallization), and so choosing the dyestuffs to be metallized that the 1:2-metal complex formed contains at least one cyclic sulfonylamidine group of the structure above specified.

(a) The monoazo dyestuffs of the Formula II are obtained by reaction of diazotized aromatic amines free from sulfonic acid groups which have in ortho-position to the amino group a group sensitive to metal, with aromatic or heterocyclic hydroxyl, primary or secondary amino compounds or enols free from sulfonic acid groups and coupling in adjacent position to the hydroxyl or amino groups, the diazo and/or coupling components being chosen so that the monoazo dyestuff formed contains at least one cyclic sulfonylamidine group.

Suitable azo components which contain a cyclic sulfonylamidine group of the above tautomeric formula are obtained for example by acting on aromatic or heterocyclic hydroxyl compounds free from sulfonic acid groups or on enols which have an unsubstituted sulfonic acid amide groups, with lactim-O-alkyl ethers in a molar amount at least corresponding to the sulfonic acid amide groups present, the following reaction thereby taking place (see Angewandte Chemie, volume 64 (1952), page 602):

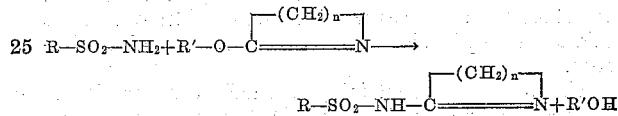

In this formula R represents the radical of an azo component capable of coupling, R' an alkyl group and $n$ one of the whole numbers 3 to 7.

For the production of suitable diazo components it is preferable to start from aromatic compounds which contain besides at least one unsubstituted sulfonic acid amide group, a substituent capable of conversion into an amino group, for example a nitro or acylamino group, in ortho-position to a complex-forming group, to react this with a lactim-O-alkyl ether in the sense of the above scheme of formulae and then to convert the substituent into the amino group. Thus for example 1-nitro-2-hydroxybenzene-5-sulfonic acid amide may be reacted with caprolactim-O-methyl ether and the resultant cyclic sulfonylamidine reduced catalytically or with iron and acid to the 1-amino-2-hydroxybenzene-5-sulfonic acid amide derivative of the formula:

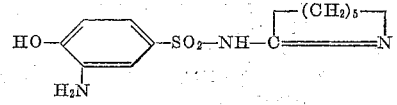

which is then diazotized and coupled.

Both the diazo and coupling component used may contain further non-ionogenic substituents, such as halogen atoms, cyano, alkyl, alkoxy, nitro, trifluoromethyl, sulfonic acid amide (possibly substituted), carboxylic acid amide and/or sulfonic acid groups.

Instead of caprolactim-O-methyl ether, there may be used for the conversion of the sulfonic acid amide groups into cyclic sulfonylamidine groups, for example, the O-methyl, O-ethyl, O-propyl or O-hexyl ethers of the lactim forms of pyrrolidone, piperidone, oenanthic lactam or capryllic lactam or their C-alkyl derivatives. The reaction between the lactim-O-alkyl ethers and the compounds containing unsubstituted sulfonic acid amide groups preferably takes place in indifferent diluents, such as alcohols, ethers, amides of low molecular weight carboxylic acids such as formamide, dimethylformamide or N-methylpyrrolidone, and may be accelerated by small amounts of basic catalysts, such as pyridine or triethylamine. The reaction is carried out at a temperature range of between 50° and 160° C., preferably between 60° and 120° C.

(b) Similarly monoazo dyestuffs of the general Formula II can be prepared by reaction of monoazo dyestuffs of the general formula III. 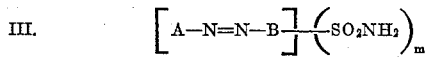

in which A, B and $m$ have the above-mentioned significance, with at least $m$ mols of the said lactim-O-alkyl ethers according to the said methods. Here also the reaction proceeds in the sense of the above reaction scheme, i.e. by conversion of the sulfonic acid amide group into the cyclic sulfonylamidine group. As initial materials for this purpose there are suitable all o.o'-dihydroxy-, o-hydroxy-o'-alkoxy, o-hydroxy-o'-carboxy- or o-hydroxy-o'-amino-azo dyestuffs which are free from sulfonic acid groups. They may also contain the above-mentioned non-ionogenic groups or atoms.

(2) The new dyestuffs may also be obtained by reaction of the 1:2-metal complexes derived from metals of the atomic numbers 24 to 29 which contain at least one monoazo dyestuff of the above general Formula III with at least $m$ mols of one of the said lactim-O-alkyl ethers according to the said methods. Here also A and B may bear the said non-ionogenic substituents. There may be used 1:2-metal complexes which contain two identical or two different azo dyestuffs of the general Formula III, and also complexes which contain besides one of the said azo dyestuffs also any other azo or azomethine dyestuff.

The new metal-containing dyestuffs thus obtainable in general dissolve well in organic solvents, lacquers and resins. They can therefore be used for coloring lacquers, and also fibers and other structures, for example consisting of polyesters and cellulose esters. Furthermore they go onto wool and fibers and other structures of synthetic polyamide from a weak acid to weak alkaline bath and are therefore suitable for dyeing, padding and printing of the said structures and furthermore, of mixed fabrics of wool and synthetic fibers. The fastness to light of the dyeings on wool is just as good as that of the corresponding dyestuffs containing unsubstituted sulfonic acid amide groups. The absorptive power of the new metal complex dyestuffs containing cyclic sulfonylamidine groups is however considerably better than that of the known dyestuffs; furthermore the new dyestuffs exhibit better fastness properties with respect to wet treatment with alkalies.

The following examples will further illustrate this invention but the invention is not restricted to these examples. The parts specified in the examples are parts by weight, unless otherwise specified.

Example 1

25.0 parts of 2-hydroxynaphthalene-6-sulfonic acid amide are stirred into 100 parts of ethanol; then 10 parts by volume of pyridine and 16.5 parts of caprolactim-O-methyl ether are added, and the whole heated under reflux on the water-bath for eight hours. The still hot solution is introduced into a mixture of 300 parts of ice-water and 20 parts of 50% caustic soda solution and then a diazo solution prepared by diazotizing 15.0 parts of 1-amino-2-hydroxy-5-chlorbenzene in the usual way is stirred in.

The precipitated azo dyestuff is filtered off by suction, washed, pressed out and then stirred with 1,000 parts of water and 16.0 parts of 50% caustic soda solution and dissolved by heating. An aqueous solution of 12.5 parts of crystallized cobalt(II) chloride and 15.0 parts of crystallized sodium acetate or potassium acetate are added and the reaction mixture stirred at 80° C. until the formation of the complex is completed.

After cooling, the finished cobalt-containing dyestuff is filtered off by suction, washed with water and dried in vacuo at 50° C.

The new cobalt-containing dyestuff, which is obtained in the form of the sodium or the potassium salt of a complex acid containing azo dyestuff radicals to each cobalt atom, dissolves in alcohols with a red-violet color and dyes wool and polyamide fibers red-violet shades of very good fastness to light and moisture from neutral or acetic acid aqueous dispersion.

If the metal-free dyestuff is reacted in known manner with a solution of chromium(III)formate, instead of which cobalt(II) chloride, the corresponding chromium-containing dyestuff is obtained which dyes wool fast blue-violet shades.

Azo dyestuffs of which the 1:2-metal complex compounds give the specified shade on wool are obtained in a corresponding way from the components listed below:

| Diazo component | Coupling component | Metal | Shade |
|---|---|---|---|
| 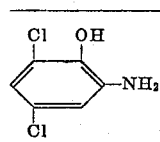 | 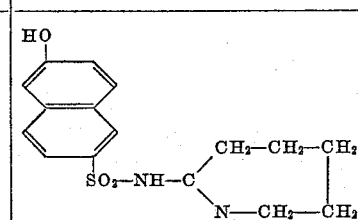 | Chromium | Navy blue. |
| 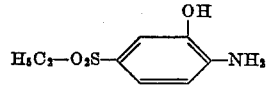 | 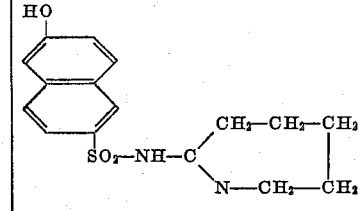 | Cobalt | Red-violet. |
| 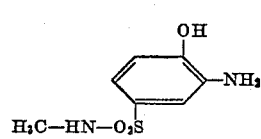 | 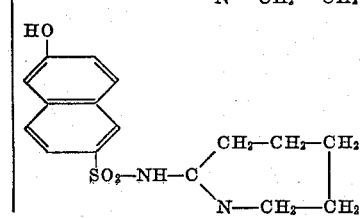 | ___do___ | Bordeaux. |

| Diazo component | Coupling component | Metal | Shade |
|---|---|---|---|
| 2-methoxyaniline (OCH₃, NH₂) | HO-naphthalene-SO₂—NH—C(CH₂CH₂CH₂)(NCH₂CH₂) | Cobalt | Bordeaux. |
| 4-chloro-2-aminophenol (OH, NH₂, Cl) | HO-naphthalene with CH₂—CH₂—CH₂\|C—HN—O₂S / CH₂—CH₂—N | Cobalt / Chromium | Violet. / Reddish blue. |
| 4-morpholinosulfonyl-2-aminophenol | HO-naphthalene with CH₂—CH₂—CH₂\|C—HN—O₂S / CH₂—CH₂—N | Cobalt / Chromium | Red violet. / Bluish violet. |
| 2-amino-4-methyl-6-nitrophenol (O₂N, OH, NH₂, H₃C) | HO-phenylpyrazole with SO₂—NH—C(CH₂CH₂CH₂)(N—CH₂—CH₂) | Chromium | Bluish red. |

Example 2

109 parts of 1-nitro-2-hydroxybenzene-5-sulfonic acid amide are boiled for 5 hours under reflux in 1,000 parts of methanol with 80 parts of caprolactim-O-methyl ether and 5 parts of triethylamine. Then about half of the methanol is distilled off and the residue stirred into 1,000 parts of water. The reaction product precipitated as a yellow resin is well kneaded with the water, and the liquid is then neutralized with hydrochloric acid.

After washing and kneading thoroughly several times each time with fresh water, the resinous product is dissolved in 400 parts of methanol and, after the addition of 10 parts Raney nickel, hydrogenated at 100° C. and a hydrogen pressure of 100 atmospheres excess pressure until the end of the absorption of hydrogen. 100 parts of the cyclic sulfonylamidine of the formula

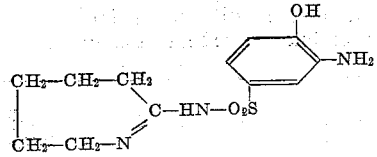

are obtained.

30 parts of this compound are dissolved in 200 parts of water. The solution is clarified with 2 parts of active carbon and filtered. 25 parts of 10-normal hydrochloric acid are added to the filtrate and diazotized with a solution of 7 parts of sodium nitrite in 20 parts of water, part of the diazo compound formed thus separating in crystalline form. The diazotization mixture is stirred into a mixture of 17 parts of 2-hydroxynaphthalene, 200 parts of water, 44 parts of 10% caustic soda solution and 16 parts of anhydrous sodium carbonate. After the end of the coupling, it is neutralized and the dyestuff formed is filtered off by suction and washed with water.

The dyestuff paste thus prepared is stirred with 600 parts of water and mixed with 68 parts of 25% ammonia solution, whereupon at 70° C. a solution of 14.4 parts of crystallized cobalt(II) chloride is introduced. After stirring for two hours at 75° to 85° C., the reaction mixture is diluted with 500 parts of water and the cobalt-containing complex dyestuff as an ammonium salt is filtered off by suction and dried at 60° C. in vacuo, whereby it is obtained in a yield of 36 parts. It dyes wool bluish Bordeaux red shades which are fast to light and moisture.

By the usual metallizing methods, for example with sodium-chromium(III) salicylate, sodium bichromate or cobalt(II) chloride, the corresponding 1:2-chromium or 1:2-cobalt complexes are obtained which dye wool fast brownish violet shades.

The following azo dyestuffs, of which the 1:2-chromium complex compounds give on wool the shades indicated, are obtained in a corresponding manner:

| Metal-free dyestuff | Metal | Shade of the 1:2-metal-complex on wool |
|---|---|---|
| (OH)(HO)—N=N— phenylpyrazole with CH₂—CH₂—CH₂\|C—HN—O₂S / CH₂—CH₂—N | Chromium | Bluish-red. |

| Metal-free dyestuff | Metal | Shade of the 1:2-metal-complex on wool |
|---|---|---|
| (structure: propyl-substituted amidine–SO$_2$NH–C$_6$H$_3$(OCH$_3$)–N=N–isoquinolinone-N-CH$_3$) | Chromium | Bluish-red. |
| (structure: propyl-substituted amidine–SO$_2$NH–C$_6$H$_3$(OH)–N=N–isoquinolinone-NH) | ----do---- | Bordeaux red. |
| (structure: pyrrolidine amidine–SO$_2$NH–C$_6$H$_3$(OH)–N=N–naphthol) | Cobalt | Do. |
| (structure: propyl amidine–SO$_2$NH–C$_6$H$_3$(OH)–N=N–naphthol-NH-COOCH$_3$) | Chromium | Blue grey. |
| (structure: ethyl-methyl amidine–SO$_2$NH–C$_6$H$_3$(OH)–N=N–naphthol) | ----do---- | Bluish violet. |

Example 3

18 parts of the dyestuff 1-amino-2-hydroxybenzene-5-sulfonic acid amide→2-hydroxynaphthalene are dissolved in 300 parts of ethanol and, after the addition of 1 part of triethylamine and 10 parts of caprolactim-O-methyl ether, boiled for 5 hours under reflux while stirring. The reaction mixture is diluted with 150 parts of water and then 20 parts of 25% ammonia solution and a solution of 7.2 parts of crystallized cobalt(II) chloride in 50 parts of water are added. After again heating to boiling until the end of the formation of the complex, the finished dyestuff is isolated by stirring into 1,000 parts of water and filtering by suction.

21 parts of a cobalt-containing dyestuff are obtained which dyes wool bluish-Bordeaux red shades from a neutral or acetic acid bath; the dyeings are very fast to light and moisture.

The same dyestuff is obtained by reacting the 1:2-cobalt complex compound of the above-mentioned initial dyestuff according to Example 1 with caprolactim-O-methyl ether, or by carrying out the condensation with the caprolactim-O-methyl ether and the metallization simultaneously or in any sequence in the same solvent, for example in formamide or in glycol.

In the same way the dyestuffs set out in the following table may be reacted with caprolactim-O-alkyl ethers and then converted into the 1:2-metal complex compound:

| Metal-free dyestuff | Metal | Shade of the dyeing of the complex on wool |
|---|---|---|
| (structure: COOH-phenyl–N=N–pyrazolone(CH$_3$)–N-phenyl–SO$_2$NH$_2$) | Chromium | Yellow. |
| (structure: H$_2$N–O$_2$S–phenyl(OH)–N=N–pyrazolone–N-phenyl) | ----do---- | Scarlet. |
| (structure: H$_2$N–O$_2$S–phenyl(OH)–N=N–pyrazolone(CH$_3$)–N-phenyl) | ----do---- | Do. |

| Metal-free dyestuff | Metal | Shade of the dyeing of the complex on wool |
|---|---|---|
| $H_5C_2-O_2S-\underset{\underset{OCH_3}{\|}}{C_6H_3}-N=N-\underset{\underset{HO}{\|}}{C_6H_3}-SO_2-NH_2$ | Cobalt | Bordeaux red. |
| $H_2N-O_2S-\underset{\underset{OH}{\|}}{C_6H_3}-N=N-\underset{\underset{HO}{\|}}{C_{10}H_4}-SO_2-N(CH_3)_2$ | do | Do. |
| $O_2N-\underset{\underset{OH}{\|}}{C_6H_3}-N=N-\underset{\underset{HO}{\|}}{C_{10}H_4}-SO_2-NH_2$ | Cobalt | Blue-violet. |
| $\underset{\underset{Cl}{\|}}{C_6H_3}(OH)-N=N-\underset{\underset{H_2N-O_2S}{\|}}{C_{10}H_4}(HO)$ | Chromium | Reddish blue. |
| $O_2N-\underset{\underset{OH}{\|}}{C_6H_3}-N=N-\underset{\underset{H_2N-O_2S}{\|}}{C_{10}H_3}(HO)-SO_2-NH_2$ | Cobalt | Blue. |
| $H_2N-O_2S-\underset{\underset{OH}{\|}}{C_6H_3}-N=N-\underset{\underset{HN-CO-CH_3}{\|}}{C_{10}H_4}(HO)$ | do | Blue violet. |
| $H_2N-O_2S-\underset{\underset{OCH_3,\ H_3C}{\|}}{C_6H_2}-N=N-\underset{\underset{SO_2-N(CH_3)_2}{\|}}{C_{10}H_4}(HO)$ | do | Red violet. |

Example 4

20.0 parts of the sodium salt of the 1:2-chromium complex compound of the dyestuff 1-amino-2-hydroxy-benzene-5-sulfonic acid amide → 1-phenyl-3-methyl-pyrazolone-(5) are stirred with 200 parts of ethanol. After adding 1 part of triethylamine and 12.5 parts of caprolactim-O-methyl ether, it is heated for several hours to boiling under reflux until the separation of a crystalline precipitate which thereby occurs has proceeded to completion. The new dyestuff is completely precipitated by pouring into 600 parts of cold water. It is stirred in the cold until the dyestuff which at first separates in part in a resinous form, has crumbled to a powder, then filtered off by suction and dried at 50° C. in vacuo.

28 to 30 parts of a chromium-containing dyestuff are obtained which dissolved in alcohols or acetone with an orange-red color. By mixing with trisodium phosphate and a dispersing agent, for example a hydroxyethylation product of a fatty alcohol, a dyestuff preparation is obtained which dissolves in hot water and dyes wool reddish orange shades which are very fast to light and level from a neutral or acetic acid bath. The dyeings have very good fastness to moisture and in this respect are clearly superior to the initial dyestuff.

Similarly reddish orange dyeings of very good fastness to light and moisture are obtained on polyamide fibers from a neutral dyebath.

If, instead of reacting the above mentioned chromium complex dyestuff containing an unsubstituted sulfonic acid amide group with caprolactim-O-methyl-ether, it is reacted in the same way with butyrolactim-O-methyl-ether, a dyestuff with similar properties is obtained.

The condensation can also be carried out in other solvents, such as formamide, glycol or mixtures of acetone and water, as well as in aqueous suspension in the presence of dispersing agents.

In the following table there are given further monoazo dyestuffs the 1:2-metal-complex compounds of which by reaction with caprolactim-O-methyl ether give wool dyestuffs which go on to wool from a neutral or weakly acid bath and which have improved fastness properties in respect of moisture:

| Metal-free azo dyestuff | Metal | Shade of the complex on wool |
|---|---|---|
| 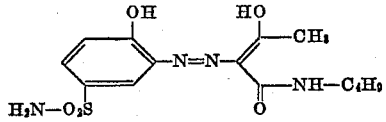 | Cobalt | Yellow. |
| 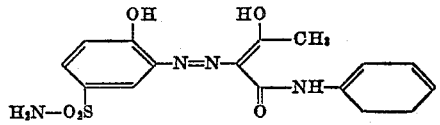 | ...do... | Do. |
| 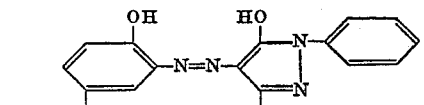 | ...do... | Reddish yellow. |
| 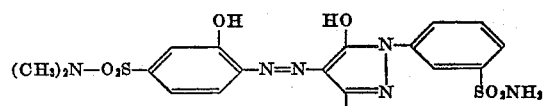 | Chromium | Red. |
| 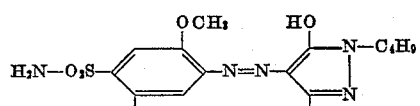 | ...do... | Do. |
| 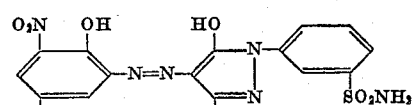 | ...do... | Bluish red. |
| 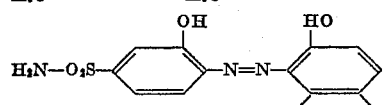 | Cobalt<br>Chromium | Red-violet.<br>Blue-violet. |
| 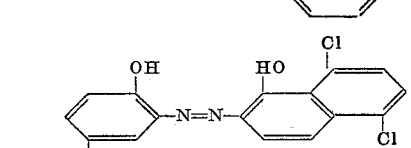 | Cobalt<br>Chromium | Red-violet.<br>Violet. |
| 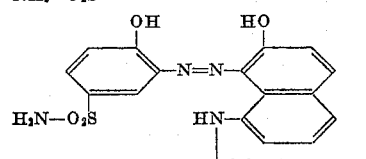 | Cobalt<br>Chromium | Violet.<br>Blue-grey. |
| 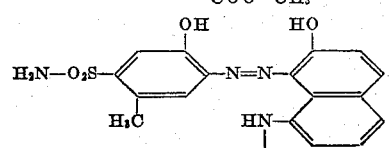 | Cobalt<br>Chromium | Blue-violet.<br>Greenish blue. |
| 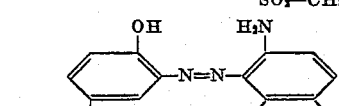 | Cobalt | Grey-blue. |
| 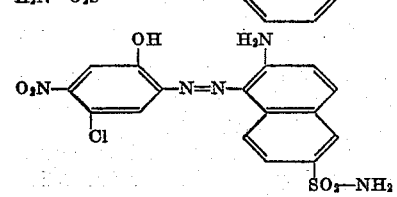 | ...do... | Greenish blue. |

Example 5

20.0 parts of the sodium salt of the mixed 1:2-chromium complex derived from the dyestuffs 1-amino-2-hydroxybenzene-5-sulfonic acid amide→1-phenyl-3-methyl-pyrazolone-(5) and 1-amino-2-hydroxybenzene-5-sulfonic acid amide→2-hydroxy-naphthalene (mol ratio of the dyestuffs 1:1) are dissolved in 200 parts of boiling ethanol. After the addition of 1 part of triethylamine and 10 parts of caprolactim-O-methyl ether, it is heated to boiling under reflux for 5 hours. Then the reaction mixture is poured into 1000 parts of water and the dyestuff formed is precipitated completely by the addition of saturated sodium chloride solution.

After filtration by suction and drying there are obtained 30 to 33 parts of a dyestuff which dyes wool fast reddish brown shades from a neutral or acetic acid bath.

The dyeings of this dyestuff on wool differ from those of the initial dyestuff by considerably better fastness to moisture.

It is also possible, in a manner similar to that described in Example 2, to condense the mixture of the metal-free dyestuffs with caprolactim-O-methyl ether and then, without working up the product, to effect chroming with chromium(III) formate in the same solution (solvent for example formamide).

The mixed cobalt complex prepared in a corresponding way gives brownish orange dyeings.

Further 1:2-metal complex compounds, obtained by metallization of the following equimolar dyestuff mixtures, can be reacted in a corresponding way with caprolactim-O-alkyl ethers; they dye wool from a neutral to weak acid solution and have good fastness properties in respect to moisture:

| Metal-free azo dyestuffs | Metal | Shade of dyeing of complex dyestuffs on wool |
|---|---|---|
| 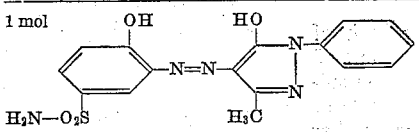 and 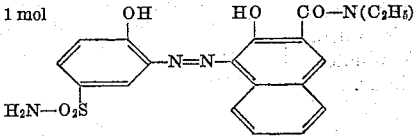 | Cobalt | Orange-brown. |
| 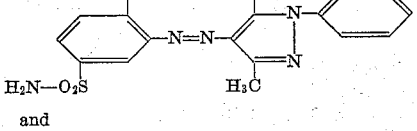 and 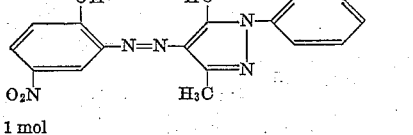 | Cobalt<br>Chromium | Reddish-yellow.<br>Orange. |
| 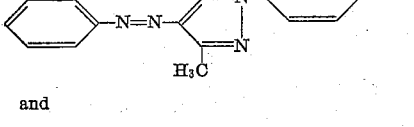 and 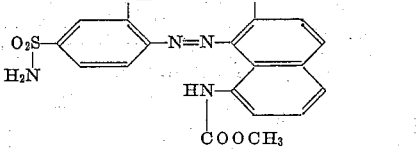 | Chromium | Green. |
| 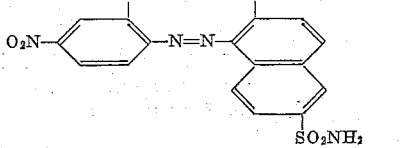 and 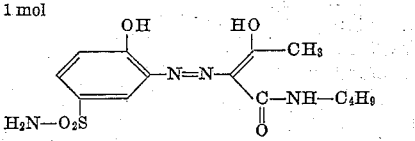 | Cobalt | Do. |

| Metal-free azo dyestuffs | Metal | Shade of dyeing of complex dyestuffs on wool |
|---|---|---|
| 1 mol 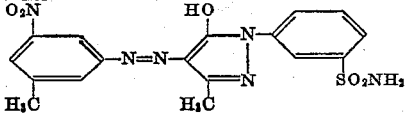 and 1 mol 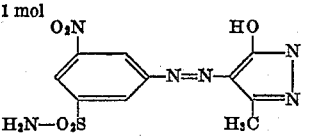 | Chromium | Bluish red. |

Example 6

100 parts of wool are given into a dyeing bath of 45° C., consisting of 5 parts of ammonium acetate, 3 parts of a 30% acetic acid and 1 to 2 parts of the sulfuric acid ester of an addition product from 80 mols of ethylene oxide to 1 mol of sperm oil alcohol or another non-ionogenic dyeing assistant, in 5,000 parts of water. After 5 minutes 3 parts of the fifth dyestuff listed in the table of structural formulae under Example 2 is added. The bath is then heated to the boil within 45 minutes, and the boiling temperature maintained for an hour.

After finishing in the usual manner there are obtained strong, very pure greenish blue shades with outstanding fastness to light and wet treatment.

Fastness to rubbing and levelling power can be improved, if no acetic acid is added.

A variant of the dyeing process consists in giving the fabric into the dyeing bath at a temperature of between 90 and 95° C. after the dyestuff has been added. The dyeing bath is then heated to the boil and the boiling temperature maintained for 30 to 60 minutes.

Example 7

100 parts of a polyamide fabric such as polycaprolactam or polyhexamethylene diamino adipate are added to a dyeing bath consisting of 5 parts of ammonium acetate, 1 to 2 parts of 25% ammonia and 1 to 2 parts of the dyeing assistant mentioned in Example 6 or any other dyeing assistant, in 3,000 parts of water. After 5 minutes 2 parts of the fourth of the dyestuffs listed in the table of structural formulae under Example 1 are added. The dyeing bath is heated to the boil within 30 minutes and the boiling temperature maintained for 2 hours. During the second hour 6 parts of ammonia sulfate is added in small quantities. After finishing in the usual manner vigorous bordeaux shades of good fastness properties are obtained.

We claim:

1. A dyestuff of the general formula

I    $(X-M-Y)^{\ominus} Q^{\oplus}$

X and Y being radicals of a monoazo dyestuff of the general formula

II    

wherein D represents a member selected from the group consisting of a hydroxyl, carboxyl and lower alkoxy group, E a member selected from the group consisting of hydrogen, chlorine and nitro, L and R each a member selected from the class consisting of hydrogen and chlorine, lower alkyl, nitro, sulfonyl amino, N-mono- and disubstituted lower saturated alkyl sulfonyl, amino, N-morpholino sulfonyl amino, and lower alkylsulfone group and a group of the formula

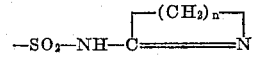

($n$ being an integer from 3 to 5) and B is a member selected from the group consisting of the radical of 2-hydroxynaphthalene, 2-hydroxy-8-acetyl-aminonaphthalene, 2-hydroxy-8-carbomethoxyaminonaphthalene, N-substituted lower alkyl acetoacetamide, phenylmethylpyrazolone,

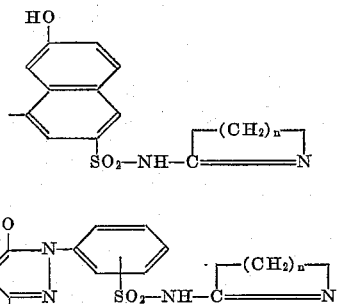

and

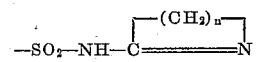

said monoazo dyestuffs X and Y each containing at the most one substituent of said formula

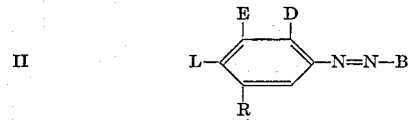

($n$ in all cases being an integer from 3 to 5), M represents a member selected from the group consisting of chromium and cobalt and $Q^{\oplus}$ a cation selected from the class consisting of a hydrogen, sodium, potassium and ammonium ion.

2. A member selected from the group consisting of the 1:2 chromium and cobalt complex of the dyestuff of the formula

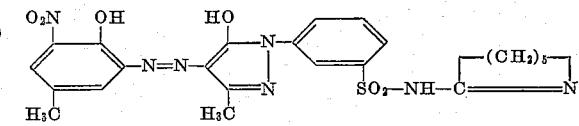

3. A member selected from the group consisting of the 1:2 chromium and cobalt complex of the dyestuff of the formula

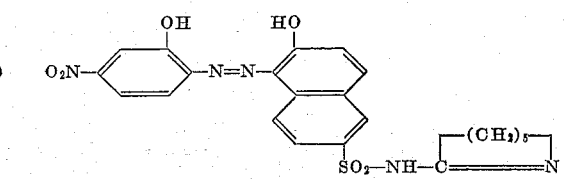

4. A member selected from the group of the 1:2 chromium and cobalt complex of the dyestuff of the formula

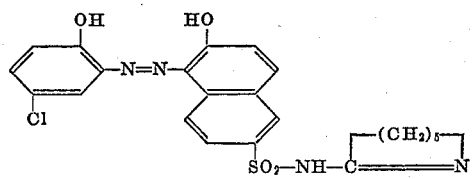

5. A member selected from the group consisting of the 1:2 chromium and cobalt complex of the dyestuff of the formula

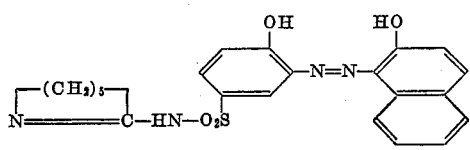

6. A member selected from the group consisting of the 1:2 chromium and cobalt complex of the dyestuff of the formula

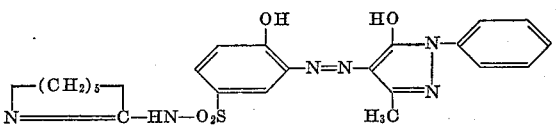

7. A member selected from the group consisting of the 1:2 chromium and cobalt complex of the dyestuff of the formula

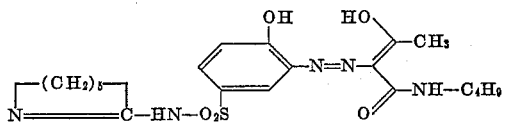

8. A member selected from the group consisting of the 1:2-chromium and cobalt complex of the dyestuff of the formula

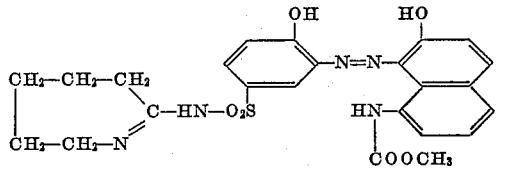

9. A member selected from the group consisting of the 1:2-chromium and cobalt complex of the dyestuff of the formula

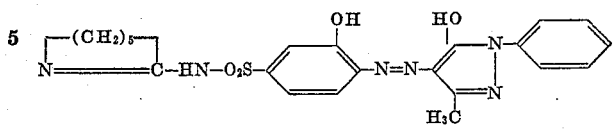

10. A member selected from the group consisting of the 1:2-chromium and cobalt complex of the dyestuff of the formula

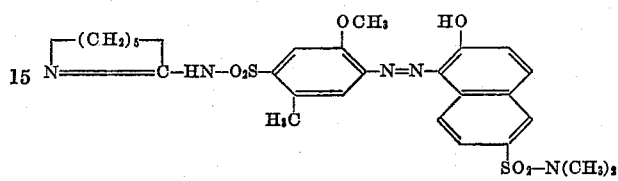

References Cited in the file of this patent

UNITED STATES PATENTS

| | | |
|---|---|---|
| 1,979,913 | Straub et al. | Nov. 6, 1934 |
| 2,012,779 | Straub et al | Aug. 27, 1935 |
| 2,711,404 | Schetty | June 21, 1955 |
| 2,749,332 | Buehler et al. | June 5, 1956 |
| 2,784,179 | Zickendraht et al. | Mar. 5, 1957 |
| 2,789,975 | Ruckstuhl | Apr. 23, 1957 |
| 2,804,454 | Beffa | Aug. 27, 1957 |
| 2,814,615 | Zickendraht | Nov. 26, 1957 |
| 2,820,784 | Zickendraht et al. | Jan. 21, 1958 |
| 2,821,524 | Maderni et al. | Jan. 28, 1958 |
| 2,826,572 | Kuster et al. | Mar. 11, 1958 |

OTHER REFERENCES

Petersen: Angewandte Chemie, p. 602, vol. 64 (1952).